(12) United States Patent
Kamino et al.

(10) Patent No.: US 11,168,740 B2
(45) Date of Patent: Nov. 9, 2021

(54) BOOT

(71) Applicant: Toyo Tire Corporation, Itami (JP)

(72) Inventors: Tomohiro Kamino, Itami (JP); Takenori Ooshita, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 363 days.

(21) Appl. No.: 16/256,023

(22) Filed: Jan. 24, 2019

(65) Prior Publication Data

US 2019/0257365 A1 Aug. 22, 2019

(30) Foreign Application Priority Data

Feb. 21, 2018 (JP) .............................. JP2018-028493

(51) Int. Cl.
| | | |
|---|---|---|
| *F16D 3/84* | (2006.01) | |
| *F16J 3/04* | (2006.01) | |
| *F16D 3/223* | (2011.01) | |
| *F16D 3/06* | (2006.01) | |
| *F16D 3/22* | (2006.01) | |

(52) U.S. Cl.
CPC .............. *F16D 3/845* (2013.01); *F16J 3/042* (2013.01); *F16D 3/065* (2013.01); *F16D 3/22* (2013.01); *F16D 3/841* (2013.01); *F16D 2003/22316* (2013.01); *Y10S 464/905* (2013.01)

(58) Field of Classification Search
CPC ........... F16D 3/845; F16D 2003/22316; F16D 3/065; F16D 3/22; F16D 3/841; F16D 2300/12; F16D 3/2055; F16J 3/042; F16J 15/525; Y10S 464/905
USPC ................................................ 464/173–175
See application file for complete search history.

(56) References Cited

U.S. PATENT DOCUMENTS 6,227,748 B1 * 5/2001 Hayward ................. F16J 3/042
464/175
6,921,091 B2 * 7/2005 Neviani .................. F16D 3/845
464/175

FOREIGN PATENT DOCUMENTS

JP 2009-068510 A 4/2009
JP 2011-33065 A 2/2011

OTHER PUBLICATIONS

Office Action dated Aug. 24, 2021, issued in counterpart JP application No. 2018-028493, with English translation. (6 pages).

* cited by examiner

*Primary Examiner* — Greg Binda
(74) *Attorney, Agent, or Firm* — Westerman, Hattori, Daniels & Adrian, LLP

(57) ABSTRACT

A boot includes a large-diameter tubular portion, a small-diameter tubular portion, and a bellows portion. The large-diameter tubular portion includes a fastening groove into which a fastening member is fitted, an opening end to which the bellows portion is coupled and into which an outer case is inserted, at least one seal lip having an annular shape and protruding from an inner circumferential surface of the large-diameter tubular portion at the position where the fastening groove is projected to the inside in the radial direction, so as to be continuous over the entire circumference, and a protrusion protruding from the inner circumferential surface on the opening end side with respect to the seal lip so as to be provided over the entire circumference. A height of the protrusion is set to be smaller than a height of the seal lip.

5 Claims, 6 Drawing Sheets

BOOT

TECHNICAL FIELD

The present invention relates to a boot. More specifically, the present invention relates to a boot that can reduce the insertion load while securing the surface pressure by a seal lip.

DESCRIPTION OF THE RELATED ART

In a constant velocity joint used for the drive shaft and the propeller shaft of an automobile and the like, a second transmission shaft is fitted into an outer case of a first transmission shaft, and a boot is mounted at the coupling portion of the first transmission shaft and the second transmission shaft. The boot seals lubricating grease in the coupling portion, and prevents the intrusion of foreign substances, such as water and mud, into the coupling portion. Mainly, the boot includes a large-diameter tubular portion into which the outer case is inserted, and a small-diameter tubular portion mounted on the second transmission shaft, the large-diameter tubular portion and the small-diameter tubular portion being coupled by a bellows portion (Patent Literature 1). To secure the surface pressure necessary for the seal against the grease and foreign substances, the boot disclosed in Patent Literature 1 is provided with three seal lips having an annular shape and protruding from an inner circumferential surface of the large-diameter tubular portion so as to be continuous over the entire circumference, and an outer circumferential surface of the large-diameter tubular portion is fastened by a fastening member having a band shape.

CITATION LIST

Patent Literature

[Patent Literature 1] Japanese Unexamined Patent Application Publication No. 2011-33065

SUMMARY OF THE INVENTION

Problems to be Solved by the Invention

However, in the above conventional art, with the increase of the height of the seal lips, the surface pressure provided from the seal lips to the outer case becomes higher, but the insertion load of the outer case to the large-diameter tubular portion becomes larger. On the contrary, when the height of the seal lips is decreased to reduce the insertion load, the surface pressure by the seal lips is unpreferably lowered. In this way, there is a problem that both the securing of the surface pressure by the seal lips and the reduction in the insertion load cannot be achieved.

The present invention has been made to solve the above problems, and an object of the present invention is to provide a boot that can reduce the insertion load while securing the surface pressure by a seal lip.

To achieve this object, a boot of the present invention is mounted on a constant velocity joint in which a second transmission shaft is fitted into an outer case of a first transmission shaft, is fastened and fixed to the constant velocity joint by fastening the outer circumferential surface of the boot by a fastening member having a band shape, and includes an elastic body. The boot includes a large-diameter tubular portion into which the outer case is inserted, a small-diameter tubular portion mounted on the second transmission shaft, and a bellows portion coupling the large-diameter tubular portion and the small-diameter tubular portion to each other and being expandable and shrinkable in the axial direction of the large-diameter tubular portion. The large-diameter tubular portion includes a fastening groove recessed in an outer circumferential surface of the large-diameter tubular portion over the entire circumference and into which the fastening member is fitted, an opening end opened to the opposite side in the axial direction of the portion to which the bellows portion is coupled and into which the outer case is inserted, at least one seal lip having an annular shape and protruding from an inner circumferential surface of the large-diameter tubular portion at the position where the fastening groove is projected to the inside in the radial direction, so as to be continuous over the entire circumference, and a protrusion protruding from the inner circumferential surface on the opening end side with respect to the seal lip so as to be provided over the entire circumference. A height of the protrusion is set to be smaller than a height of the seal lip.

Effect of the Invention

According to the boot in a first aspect, the height of the protrusion protruding from the inner circumferential surface of the large-diameter tubular portion on the opening end side with respect to the seal lip is set to be smaller than the height of the seal lip. With this, after the outer case is inserted into the protrusion provided over the entire circumference so that the large-diameter tubular portion is slightly expanded to the outside in the radial direction, the outer case is further inserted into the seal lip so that the large-diameter tubular portion is expanded to the outside in the radial direction. Thus, the insertion load of the outer case to the large-diameter tubular portion can be distributed by the protrusion and the seal lip, so that the maximum value of the insertion load of the outer case can be reduced without decreasing the height of the seal lip to lower the surface pressure by the seal lip. With this, while the surface pressure by the seal lip is secured, the insertion load can be reduced by the protrusion.

According to the boot in a second aspect, the seal lip and the protrusion are disposed so as to be spaced from each other in the axial direction. In the cross section including an axis of the large-diameter tubular portion, a distance from the axis to the inner circumferential surface between the seal lip and the protrusion and a distance from the axis to the inner circumferential surface at the portion of the seal lip continuous to the bellows portion side are set to be the same. With this, when the seal lip is pressed to the outer case, the seal lip can be deformed substantially uniformly to both sides in the axial direction, and the inhibition of the deformation of the seal lip by the protrusion can be prevented. As a result, in addition to the effect of the first aspect, the surface pressure from the seal lip to the outer case can be substantially uniform, so that the surface pressure by the seal lip can be higher.

According to the boot in a third aspect, the inner circumferential surface of the large-diameter tubular portion includes a diameter reduction portion that is reduced in diameter from the opening end toward the protrusion in the cross section including the axis, and a parallel portion that couples the diameter reduction portion and the protrusion in parallel with the axis of the large-diameter tubular portion in the cross section including the axis. In the cross section including the axis, a distance from the axis to the parallel portion is set to be equal to or less than a distance from the axis to the outer circumferential surface of the outer case. With this, when the outer case is inserted into the large-diameter tubular portion, the outer case can be inserted into the protrusion and the seal lip in a state where the outer case is guided to the parallel portion along the diameter reduction portion to determine the position in the radial direction of the outer case with respect to the large-diameter tubular portion. As a result, in addition to the effect of the first aspect, it is possible to prevent the increase of the insertion load to the protrusion and the variation in the surface pressure by the seal lip in the circumferential direction, which are caused by the shift of the position in the radial direction.

According to the boot in a fourth aspect, the height of the protrusion is set to 40% to 85% of the height of the seal lip. With this, the insertion load of the outer case to the large-diameter tubular portion can be distributed efficiently by the protrusion and the seal lip. Thus, in addition to the effect of the first aspect, the maximum value of the insertion load of the outer case can be further reduced.

MODE FOR CARRYING OUT THE INVENTION

Figure 1:
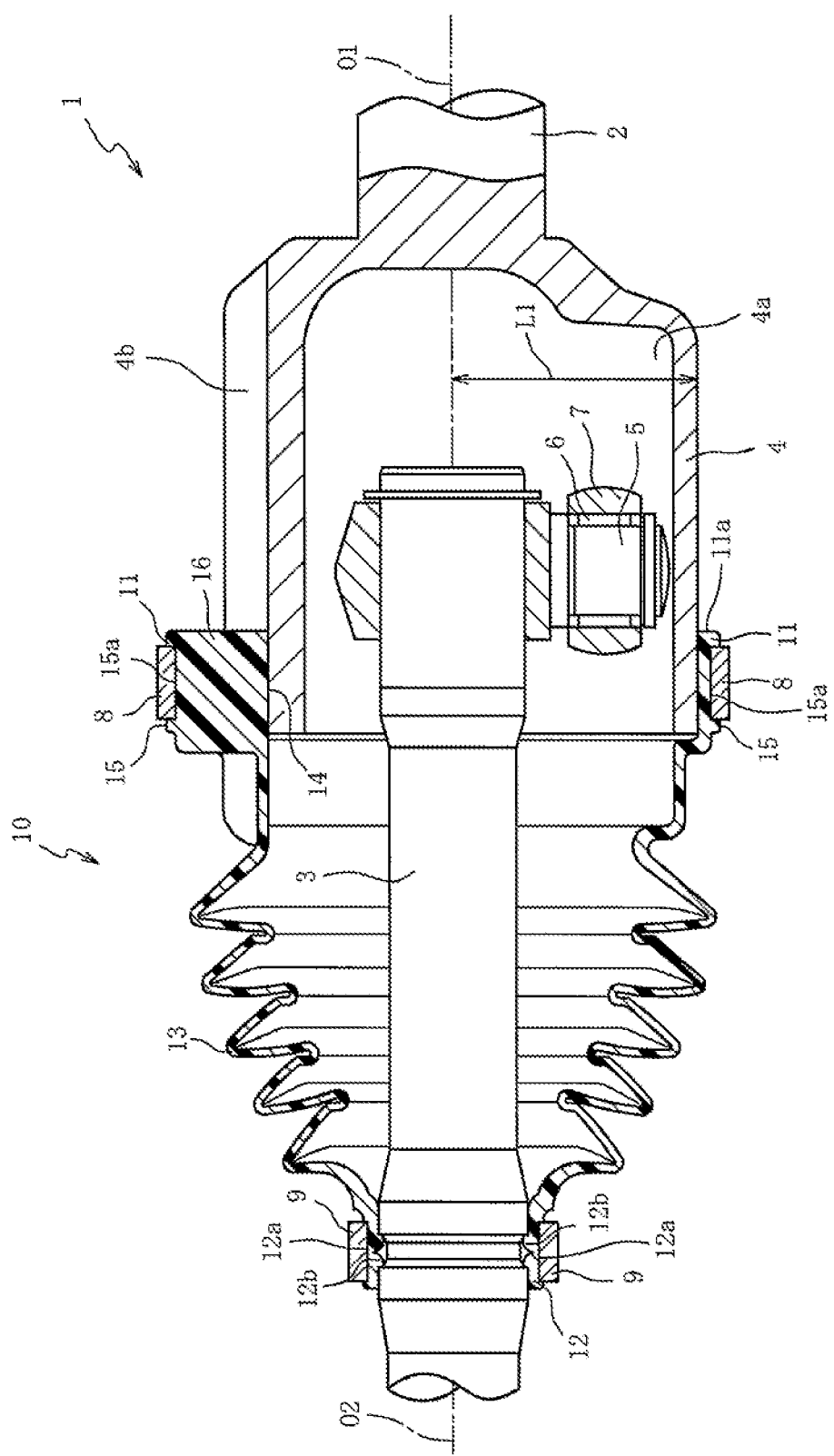
FIG. 1 is a cross-sectional view of a constant velocity joint on which a boot according to a first embodiment of the present invention is mounted.
Figure 2:
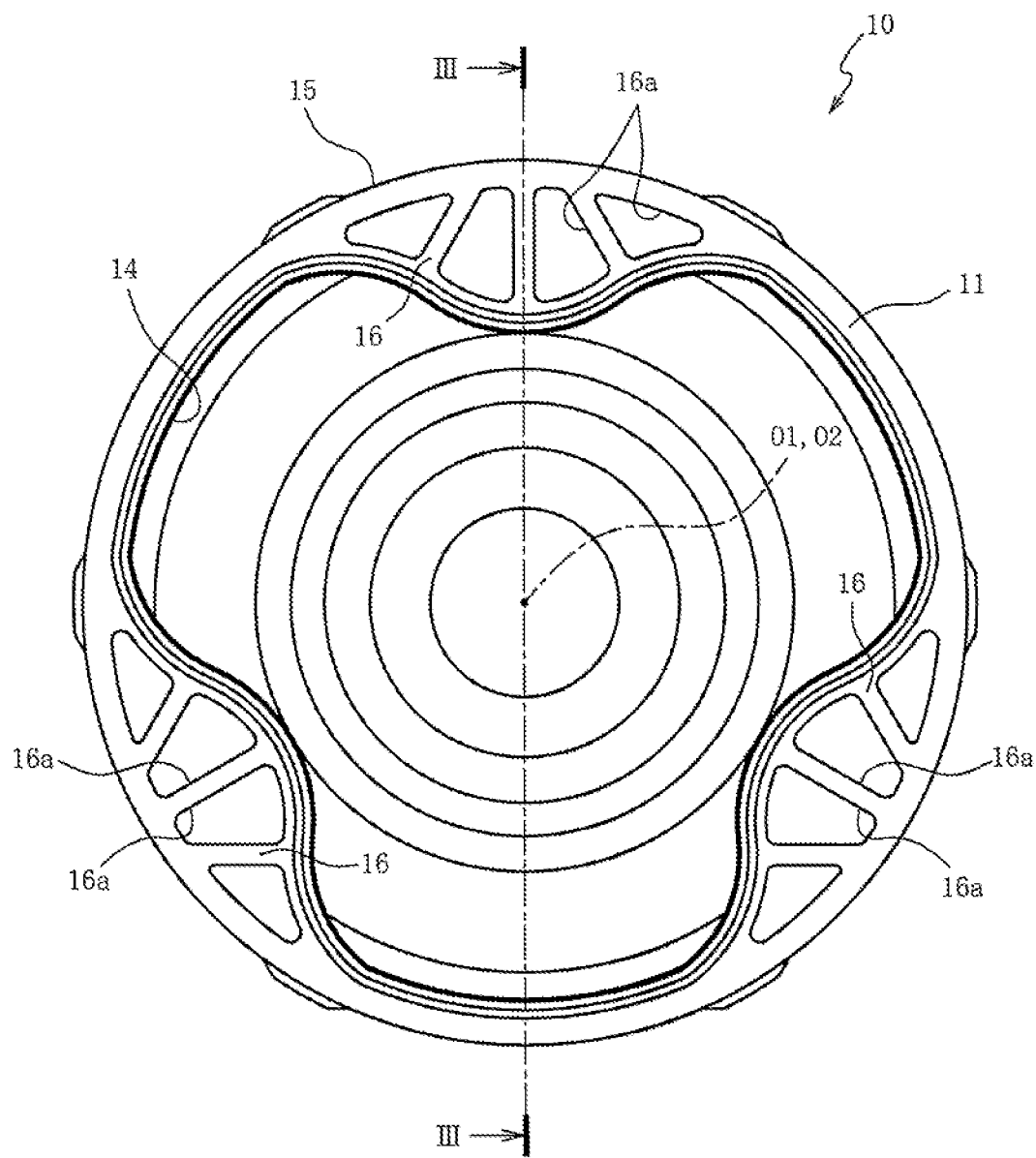
FIG. 2 is a front view of the boot.
Figure 3:
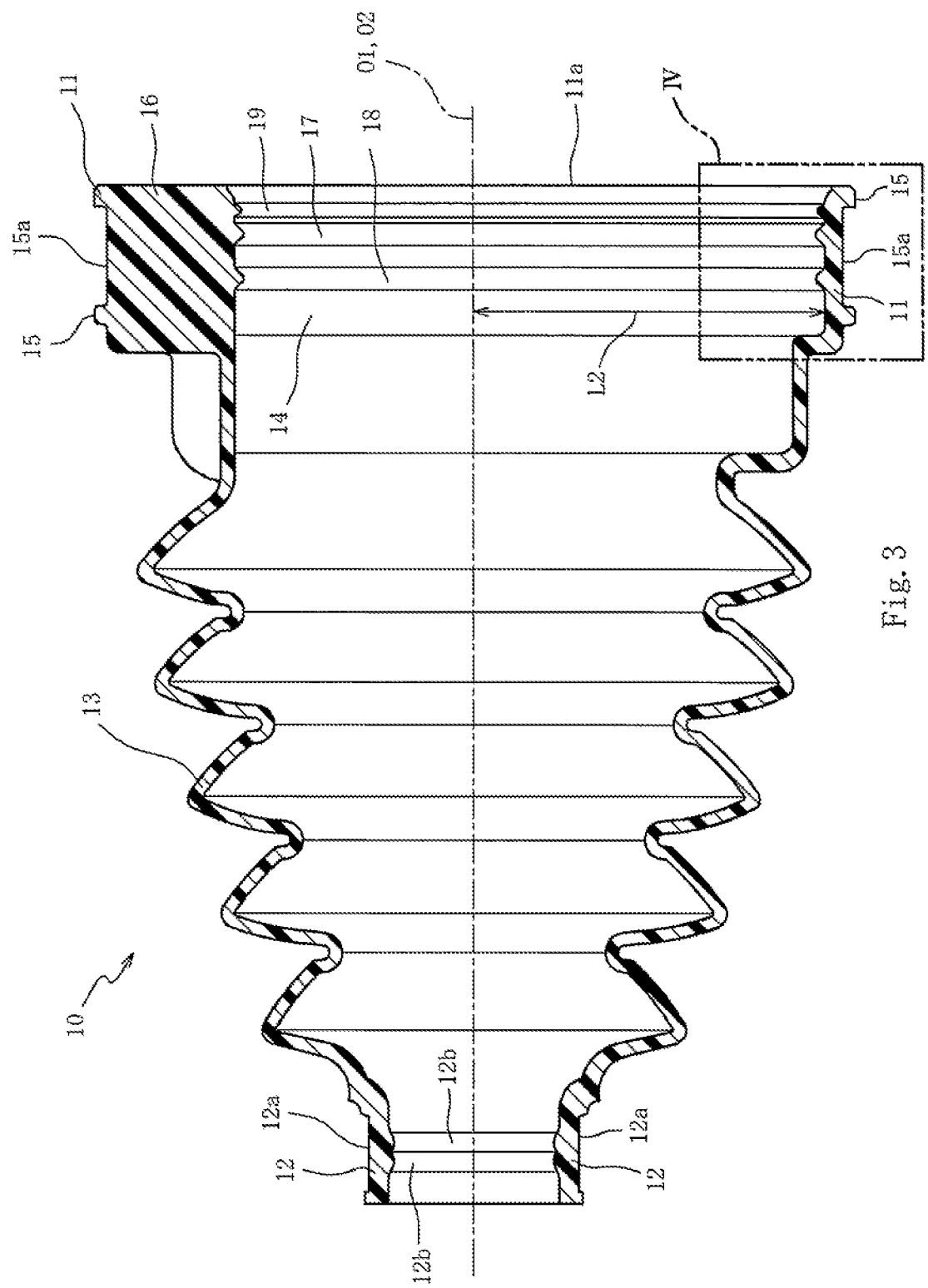
FIG. 3 is a cross-sectional view of the boot taken along line III-III of FIG. 2.

Hereinbelow, preferred embodiments of the present invention will be described with reference to the accompanying drawings. First, referring to FIGS. 1, 2, and 3, a boot 10 according to a first embodiment of the present invention will be described. FIG. 1 is a cross-sectional view of a constant velocity joint 1 on which the boot 10 is mounted. FIG. 2 is a front view of the boot 10 in an unloaded state. FIG. 3 is a cross-sectional view of the boot 10 taken along line III-III of FIG. 2. FIG. 1 illustrates a state where an axis O1 of a first transmission shaft 2 (a large-diameter tubular portion 11) and an axis O2 of a second transmission shaft 3 (a small-diameter tubular portion 12) coincide with each other. Herein, unless otherwise specified, the axial direction of the axis O1 of the first transmission shaft 2 (the large-diameter tubular portion 11) is simply referred to as an axial direction.

As illustrated in FIG. 1, the boot 10 is the member mounted at the coupling portion of the constant velocity joint 1. The constant velocity joint 1 transmits the rotational force at constant velocity while changing its angle at the coupling portion of the first transmission shaft 2 and the second transmission shaft 3, and is used for the drive shaft and the propeller shaft of an automobile and the like. In this embodiment, the constant velocity joint 1 of the tripod type that is expandable and shrinkable at the coupling portion and can transmit the rotational force will be described.

At the end of the first transmission shaft 2 of the constant velocity joint 1, an outer case 4 having a tubular shape and including one end that is opened and the other end that is closed is provided. In the inner circumferential surface of the outer case 4, three guiding grooves 4a that are provided so as to extend in the axial direction (the left-right direction in FIG. 1) are disposed so as to be equally spaced from each other (an interval of 120°) in the circumferential direction. In the outer circumferential surface of the outer case 4, three mounting grooves 4b are provided at the positions between the three guiding grooves 4a so as to extend in the axial direction. A distance L1 from the axis O1 to the outer circumferential surface of the outer case 4 is substantially constant over the axial direction, and is different in the circumferential direction, depending on the mounting grooves 4b.

At the end of the second transmission shaft 3 of the constant velocity joint 1, three trunnions 5 are provided so as to protrude in the direction perpendicular to the axis. Roller members 7 having a ring shape are fitted onto the respective trunnions 5 via a plurality of needle bearings 6. The second transmission shaft 3 is fitted into the outer case 4 so that the roller members 7 are fitted into the guiding grooves 4a, thereby configuring the constant velocity joint 1.

In such the constant velocity joint 1, for example, when the tire moves up and down to change the effective length of the drive shaft, the roller members 7 slide along the guiding grooves 4a. With this, the first transmission shaft 2 and the second transmission shaft 3 are relatively changed in the position (expanded and shrunk in the axial direction), so that the constant velocity joint 1 can absorb the change in the effective length of the drive shaft.

The boot 10 serves to seal grease necessary for lubricating the coupling portion of the constant velocity joint 1 in its interior, and to prevent the intrusion of foreign substances, such as water and mud, into the coupling portion. The boot 10 includes the large-diameter tubular portion 11 mounted on the outer case 4, the small-diameter tubular portion 12 mounted on the second transmission shaft 3, and a bellows portion 13 coupling the large-diameter tubular portion 11 and the small-diameter tubular portion 12 to each other. In a state where the boot 10 is mounted on the constant velocity joint 1, the axis O1 of the large-diameter tubular portion 11 and the axis O1 of the first transmission shaft 2 coincide with each other, and the axis O2 of the small-diameter tubular portion 12 and the axis O2 of the second transmission shaft 3 coincide with each other.

In the boot 10, the large-diameter tubular portion 11, the small-diameter tubular portion 12, and the bellows portion 13 are integrally configured of a thermoplastic elastomer resin. It should be noted that the material of the boot 10 is an elastic body, and examples of the elastic body other than the thermoplastic elastomer resin include, for example, a thermosetting elastomer resin and a synthetic rubber. In addition, the boot 10 is manufactured by combining injection molding and blow molding, but may be manufactured by other known methods.

As illustrated in FIGS. 1, 2, and 3, the large-diameter tubular portion 11 is a substantially cylindrical portion. The large-diameter tubular portion 11 is provided with an opening end 11a in which one end in the axial direction is coupled to the bellows portion 13 and the other end in the axial direction is opened to the outside. After the outer case 4 is inserted from the opening end 11a toward an inner circumferential surface 14 side of the large-diameter tubular portion 11, a fastening member 8 made of metal and having a band shape is wound and fastened on an outer circumferential surface 15 of the large-diameter tubular portion 11, so that the large-diameter tubular portion 11 is fastened and fixed to the outer case 4.

In the large-diameter tubular portion 11, the inner circumferential surface 14 is formed in an uneven shape corresponding to the outer circumferential surface of the outer case 4, can come into contact with the outer circumferential surface of the outer case 4, and cannot rotate relatively with respect to the outer case 4. In detail, on the inner circumferential surface 14 of the large-diameter tubular portion 11, three bulging portions 16 that bulge to the inside in the radial direction are disposed so as to be distributed to be equally spaced from each other (at an interval of 120°) in the circumferential direction. These three bulging portions 16 are respectively fitted into the three mounting grooves 4b that are recessed in the outer circumferential surface of the outer case 4.

It should be noted that a plurality of lightening holes 16a that are opened to the opening end 11a are formed in each bulging portion 16. By the lightening holes 16a, the bulging portion 16 can be reduced in weight, and the cooling speed of the entire bulging portion 16 can be made uniform during the molding of the boot 10 to mold the bulging portion 16 with high accuracy. By molding the bulging portion 16 with high accuracy, the seal ability between the large-diameter tubular portion 11 and the outer circumferential surface of the outer case 4 can be improved.

In the outer circumferential surface 15 of the large-diameter tubular portion 11, a fastening groove 15a that is continuously recessed over the entire circumference is formed. The width (the dimension in the axial direction) of the fastening groove 15a is the same as the width of the band-shaped fastening member 8, and the fastening member 8 is fitted into the fastening groove 15a.

The small-diameter tubular portion 12 is a substantially cylindrical portion. After the second transmission shaft 3 is inserted into the small-diameter tubular portion 12, a fastening member 9 made of metal and having a band shape is wound and fastened on the outer circumferential surface of the small-diameter tubular portion 12, so that the small-diameter tubular portion 12 is fastened and fixed to the second transmission shaft 3. In the outer circumferential surface of the small-diameter tubular portion 12, a fastening groove 12a into which the fastening member 9 is fitted is provided.

In the portions of the inner circumferential surface of the small-diameter tubular portion 12 in which the fastening groove 12a is projected to the inside in the radial direction, two seal lips 12b for the seal between the small-diameter tubular portion 12 and the second transmission shaft 3 are provided so as to be continuous over the entire circumference. The two seal lips 12b are disposed so as to be symmetrical with respect to a center position C in the axial direction of the fastening groove 12a, and are set to the same height. That is, the two seal lips 12b are formed so as to be symmetrical with respect to the center position C in the axial direction of the fastening groove 12a.

The bellows portion 13 includes valley portions and ridge portions that are formed so as to be repeatedly continuous in the axial direction, and is expandable and shrinkable toward the axial direction. The bellows portion 13 is formed in a tapered shape that is reduced in diameter entirely from the large-diameter tubular portion 11 side toward the small-diameter tubular portion 12 side. The inner space formed by the bellows portion 13 becomes the space for sealing the grease.

Figure 4:
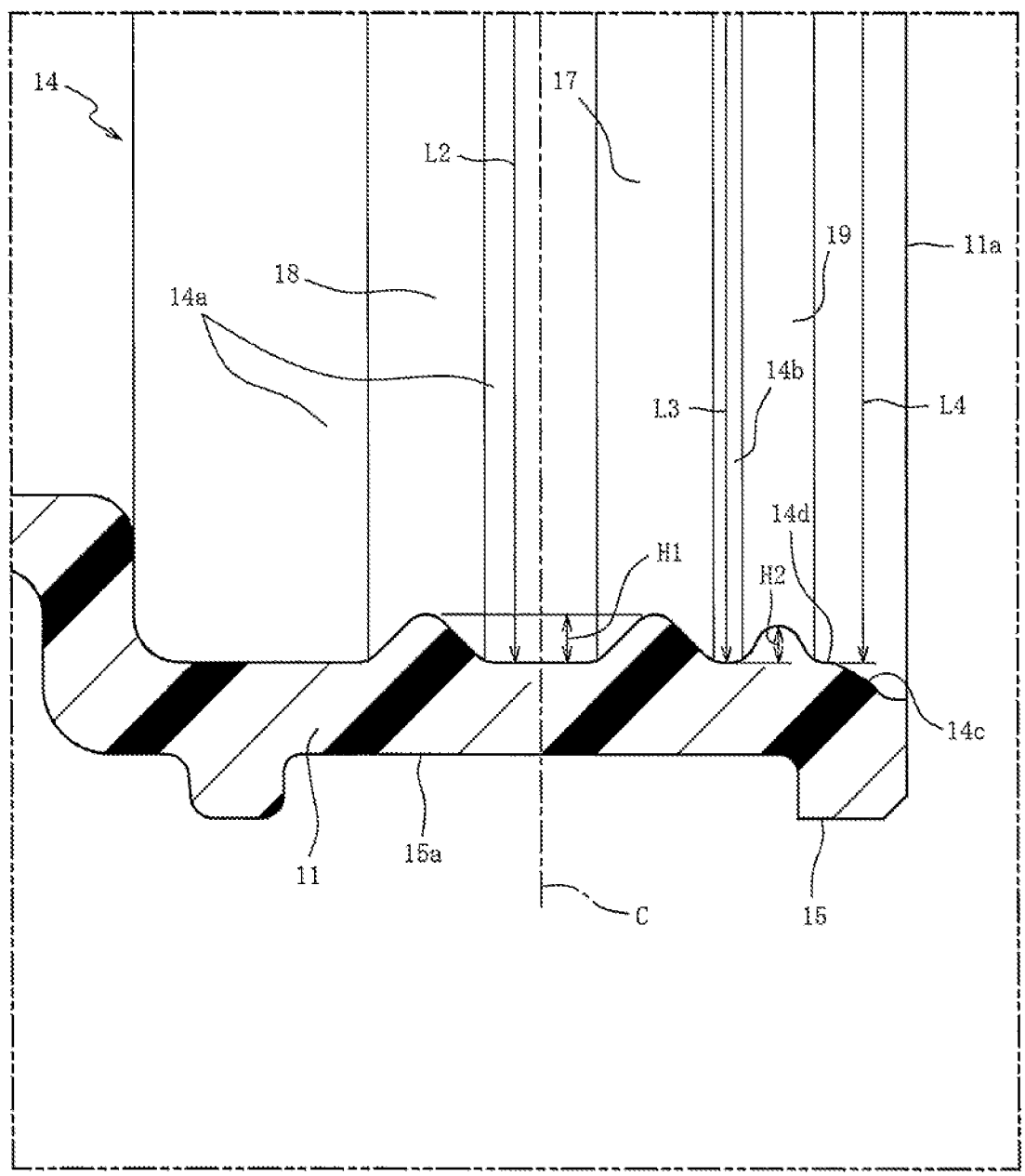
FIG. 4 is a partially enlarged cross-sectional view of the boot enlargedly illustrating the portion indicated by IV of FIG. 3.

Next, the large-diameter tubular portion 11 will be described in more detail with reference to FIG. 4. FIG. 4 is a partially enlarged view of the boot 10 enlargedly illustrating the portion indicated by IV of FIG. 3. As illustrated in FIG. 4, in the large-diameter tubular portion 11, two seal lips 17 and 18 and one protrusion 19 that protrude from the inner circumferential surface 14 are provided so as to be continuous over the entire circumference.

The seal lips 17 and 18 are the portions that provide the local surface pressure to the outer case 4 for the seal between the large-diameter tubular portion 11 and the outer case 4. The seal lips 17 and 18 are provided on the inner circumferential surface 14 at the positions where the fastening groove 15a is projected to the inside in the radial direction. With this, when the large-diameter tubular portion 11 is fastened by the fastening member 8, the seal lips 17 and 18 can be reliably pressed to the outer case 4. Thus, the surface pressure necessary for the seal between the large-diameter tubular portion 11 and the outer case 4 can be provided from the seal lips 17 and 18 to the outer case 4. It should be noted that as a height H1 of the seal lips 17 and 18 is larger, the surface pressure by the seal lips 17 and 18 can be higher, so that the seal ability between the large-diameter tubular portion 11 and the outer case 4 can be improved without strongly fastening the fastening member 8.

The seal lips 17 and 18 are disposed so as to be symmetrical with respect to the center position C in the axial direction of the fastening groove 15a, and are set to the same height H1. That is, the seal lips 17 and 18 are formed so as to be symmetrical with respect to the center position C in the axial direction of the fastening groove 15a. With this, when the large-diameter tubular portion 11 is fastened by the fastening member 8, the surface pressure from the seal lips 17 and 18 to the outer case 4 can be substantially uniform, so that the surface pressure by the seal lips 17 and 18 can be higher.

The protrusion 19 is disposed on the opening end 11a side with respect to the seal lip 17. A height H2 of the protrusion 19 is set to be smaller than the height H1 of the seal lips 17 and 18. Part of the protrusion 19 is provided on the inner circumferential surface 14 at the position where the fastening groove 15a is projected to the inside in the radial direction. With this, when the large-diameter tubular portion 11 is fastened by the fastening member 8, the protrusion 19 can be pressed to the outer case 4, so that the protrusion 19 that is continuous over the entire circumference can provide the seal between the large-diameter tubular portion 11 and the outer case 4.

The inner circumferential surface 14 of the large-diameter tubular portion 11 includes a first portion 14a on the bellows portion 13 side with respect to each of the seal lips 17 and 18, a second portion 14b between the seal lip 17 and the protrusion 19, a diameter reduction portion 14c that is reduced in diameter from the opening end 11a toward the protrusion 19, and a parallel portion 14d that couples the diameter reduction portion 14c and the protrusion 19.

In the cross section including the axis O1, the first portion 14a, the second portion 14b, and the parallel portion 14d are parallel with the axis O1 of the large-diameter tubular portion 11. In the cross section including the axis O1, a distance L2 from the axis O1 to the first portion 14a, a distance L3 from the axis O1 to the second portion 14b, and a distance L4 from the axis O1 to the parallel portion 14d are set to be substantially the same as the distance L1 from the axis O1 to the outer circumferential surface of the outer case 4. It should be noted that the first portion 14a is the portion from which the seal lip 18 is removed.

The second portion 14b is the portion for disposing the seal lip 17 and the protrusion 19 so as to be spaced from each other in the axial direction. In this way, the seal lip 17 and the protrusion 19 are spaced from each other, and the distance L2 from the axis O1 to the first portion 14a and the distance L3 from the axis O1 to the second portion 14b are the same. Thus, when the seal lips 17 and 18 are pressed to the outer case 4, the seal lips 17 and 18 can be deformed substantially uniformly to both sides in the axial direction, and the inhibition of the deformation of the seal lip 17 by the protrusion 19 can be prevented. As a result, the surface pressure from the seal lips 17 and 18 to the outer case 4 can be substantially uniform, so that the surface pressure by the seal lips 17 and 18 can be higher.

According to the boot 10 as described above, when the outer case 4 is inserted into the large-diameter tubular portion 11, the outer case 4 is first inserted into (or pressed into) the protrusion 19 that is provided on the entire circumference of the inner circumferential surface 14 of the large-diameter tubular portion 11, so that the large-diameter tubular portion 11 is slightly expanded to the outside in the radial direction. After that, the outer case 4 is inserted into the seal lips 17 and 18 in which the height H1 is larger than the height H2 of the protrusion 19, so that the large-diameter tubular portion 11 is further expanded to the outside in the radial direction. Thus, the insertion load of the outer case 4 to the large-diameter tubular portion 11 can be distributed by the protrusion 19 and, of the seal lips 17 and 18, the seal lip 17 on the side closest to the opening end 11a.

Here, for the insertion load of the outer case 4 to the large-diameter tubular portion 11, the maximum value of the insertion load to the seal lip 17 and the insertion load to the protrusion 19 is dominant. Thus, the insertion load of the outer case 4 to the large-dimeter tubular portion 11 is distributed by the protrusion 19 and, of the seal lips 17 and 18, the seal lip 17 on the side closest to the opening end 11a, so that the maximum value of the insertion load of the outer case 4 can be reduced, and the outer case 4 can be inserted into the large-diameter tubular portion 11 by a small force.

Thus, while the surface pressure necessary for the seal between the outer case 4 and the large-diameter tubular portion 11 is secured by the seal lips 17 and 18, the insertion load of the outer case 4 can be reduced by the protrusion 19 that is disposed on the opening end 11a side with respect to the seal lips 17 and 18. That is, without decreasing the height H1 of the seal lips 17 and 18 to lower the surface pressure by the seal lips 17 and 18 in order to reduce the insertion load, the insertion load can be reduced by the protrusion 19 while the height H1 remains the same. In addition, even when the height H1 of the seal lips 17 and 18 is increased to make the surface pressure by the seal lips 17 and 18 higher, the insertion load can be reduced by the protrusion 19, as compared with the case where the protrusion 19 is absent and the height H1 is not increased.

When the outer case 4 is inserted into the large-diameter tubular portion 11, the outer case 4 can be guided to the parallel portion 14d along the diameter reduction portion 14c that is reduced in diameter toward the protrusion 19 in the cross section including the axis O1. Further, since in the cross section including the axis O1, the distance L4 from the axis O1 to the parallel portion 14d parallel with the axis O1 and the distance L1 from the axis O1 to the outer circumferential surface of the outer case 4 are the same, the position in the radial direction of the outer case 4 guided to the parallel portion 14d, with respect to the large-diameter tubular portion 11 is determined. Then, in a state where the position in the radial direction of the outer case 4 with respect to the large-diameter tubular portion 11 is determined, the outer case 4 can be inserted into the protrusion 19 and the seal lips 17 and 18. As a result, the increase of the insertion load to the protrusion 19 due to the shift of the position in the radial direction of the outer case 4 with respect to the large-diameter tubular portion 11 can be prevented, and the variation in the surface pressure by the seal lips 17 and 18 in the circumferential direction due to the shift can be prevented.

It should be noted that for the insertion load of the outer case 4 to the large-diameter tubular portion 11, as the ratio of the height H2 of the protrusion 19 to the height H1 of the seal lips 17 and 18 (H2/H1) is increased, the insertion load to the seal lips 17 and 18 becomes smaller, so that the insertion load to the protrusion 19 becomes larger. It should be noted that since the seal lips 17 and 18 have the same height H1, the insertion load to the seal lip 18 on the far side from the opening end 11a is slightly smaller than the insertion load to the seal lip 17. Thus, when the insertion load to the seal lip 17 and the insertion load to the protrusion 19 are uniform, the maximum value of the insertion load of the outer case 4 is the smallest.

Figure 5:
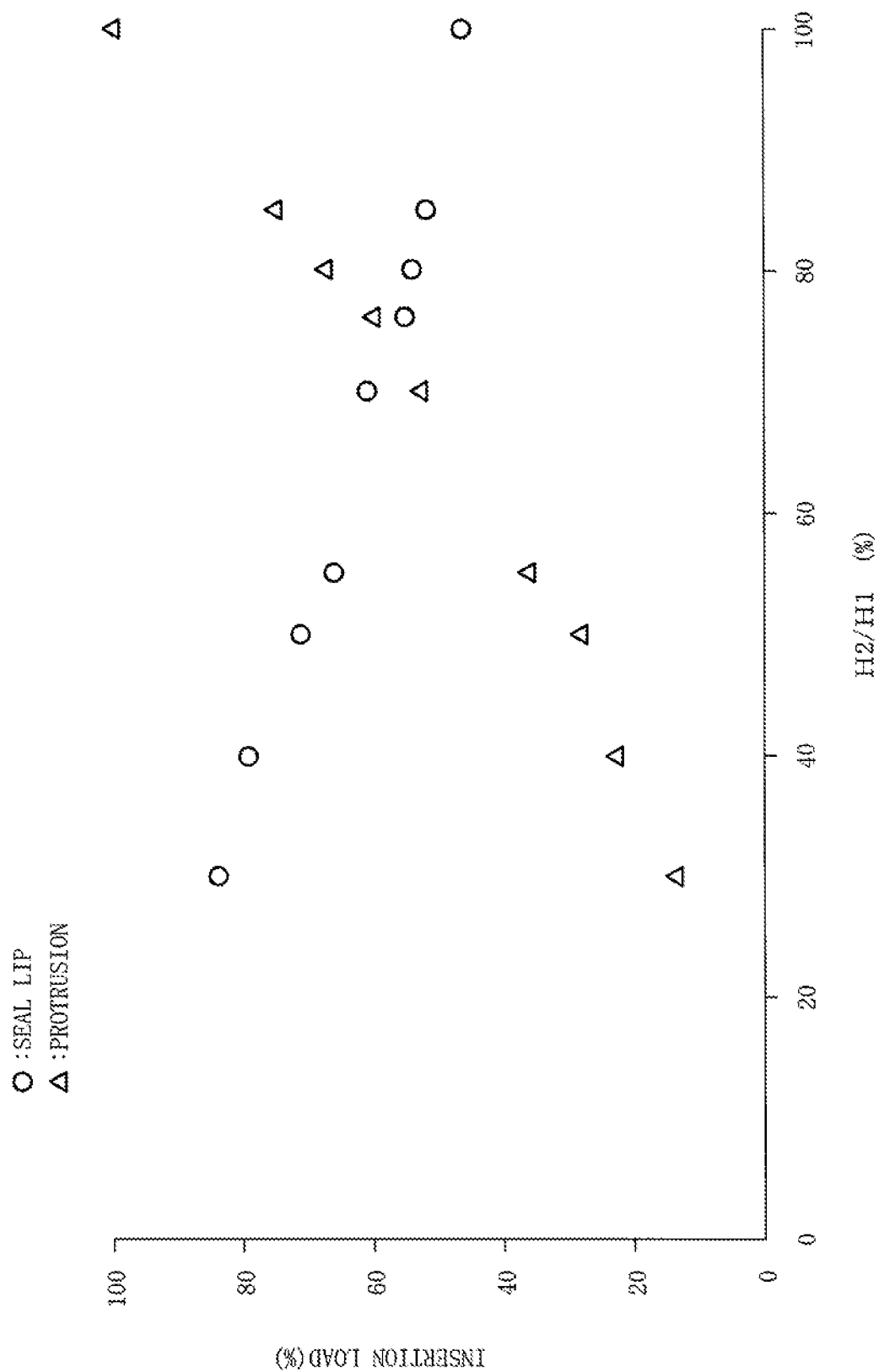
FIG. 5 is a graph illustrating the change in the insertion load.

Next, referring to the graph of FIG. 5, the change in the insertion load to the seal lip 17 and the insertion load to the protrusion 19 when H2/H1 is changed will be described. For the graph of FIG. 5, the abscissa axis indicates H2/H1, and the ordinate axis indicates the insertion load. On the graph of FIG. 5, the insertion load to the seal lip 17 is indicated by circles, and the insertion load to the protrusion 19 is indicated by triangles. FIG. 5 is a graph in which the insertion load to the protrusion 19 when H2/H1 is 100% is 100%. It should be noted that the relationship between H2/H1 and the insertion load to the seal lip 17 and the insertion load to the protrusion 19 represents substantially the same behavior as FIG. 5 even when the absolute value of the insertion load to the protrusion 19 when H2/H1 is 100% is changed.

As illustrated in FIG. 5, H2/H1 is approximately 75%, the insertion load to the seal lip 17 and the insertion load to the protrusion 19 are substantially the same, and the insertion load to the seal lip 17 and the insertion load to the protrusion 19 are approximately 0.6 times the case where H2/H1 is 100%. That is, when H2/H1 is approximately 75%, the maximum value of the insertion load of the outer case 4 is the smallest.

The change in the insertion load to the seal lip 17 with respect to the change in H2/H1 is smaller than the change in the insertion load to the protrusion 19 with respect to the change in H2/H1. Thus, when the insertion load to the seal lip 17 is dominant as the insertion load of the outer case 4, and when H2/H1 is lower than approximately 75%, a state where the maximum value of the insertion load of the outer case 4 is reduced can be maintained in a relatively wide range. On the other hand, when the insertion load to the protrusion 19 is dominant as the insertion load of the outer case 4, and when H2/H1 is higher than approximately 75%, a state where the maximum value of the insertion load of the outer case 4 is reduced can be maintained in a relatively narrow range.

In addition, depending on the fastening force of the fastening member 8, when H2/H1 is high, there is a possibility that the seal ability of the seal lip 17 is lowered by the protrusion 19. When H2/H1 is low, the seal ability of the seal lip 17 can be close to the seal ability of the seal lip 17 in the absence of the protrusion 19, but it is difficult to reduce the maximum value of the insertion load of the outer case 4. Consequently, there is a possibility that the equipment for inserting the outer case 4 into the large-diameter tubular portion 11 becomes larger, and there is a possibility that the worker, if he/she can provide only a small insertion force, cannot insert the outer case 4 into the large-diameter tubular portion 11 during the working.

By setting H2/H1 to the range of 40% to 85%, while the seal ability of the seal lip 17 is improved, the insertion load to the seal lip 17 and the insertion load to the protrusion 19 are distributed efficiently, so that the maximum value of the insertion load of the outer case 4 can be reduced. Further, by setting H2/H1 to the range of 55% to 80%, while the seal ability of the seal lip 17 is further improved, the insertion load to the seal lip 17 and the insertion load to the protrusion 19 are distributed more efficiently, so that the maximum value of the insertion load of the outer case 4 can be further reduced.

Figure 6:
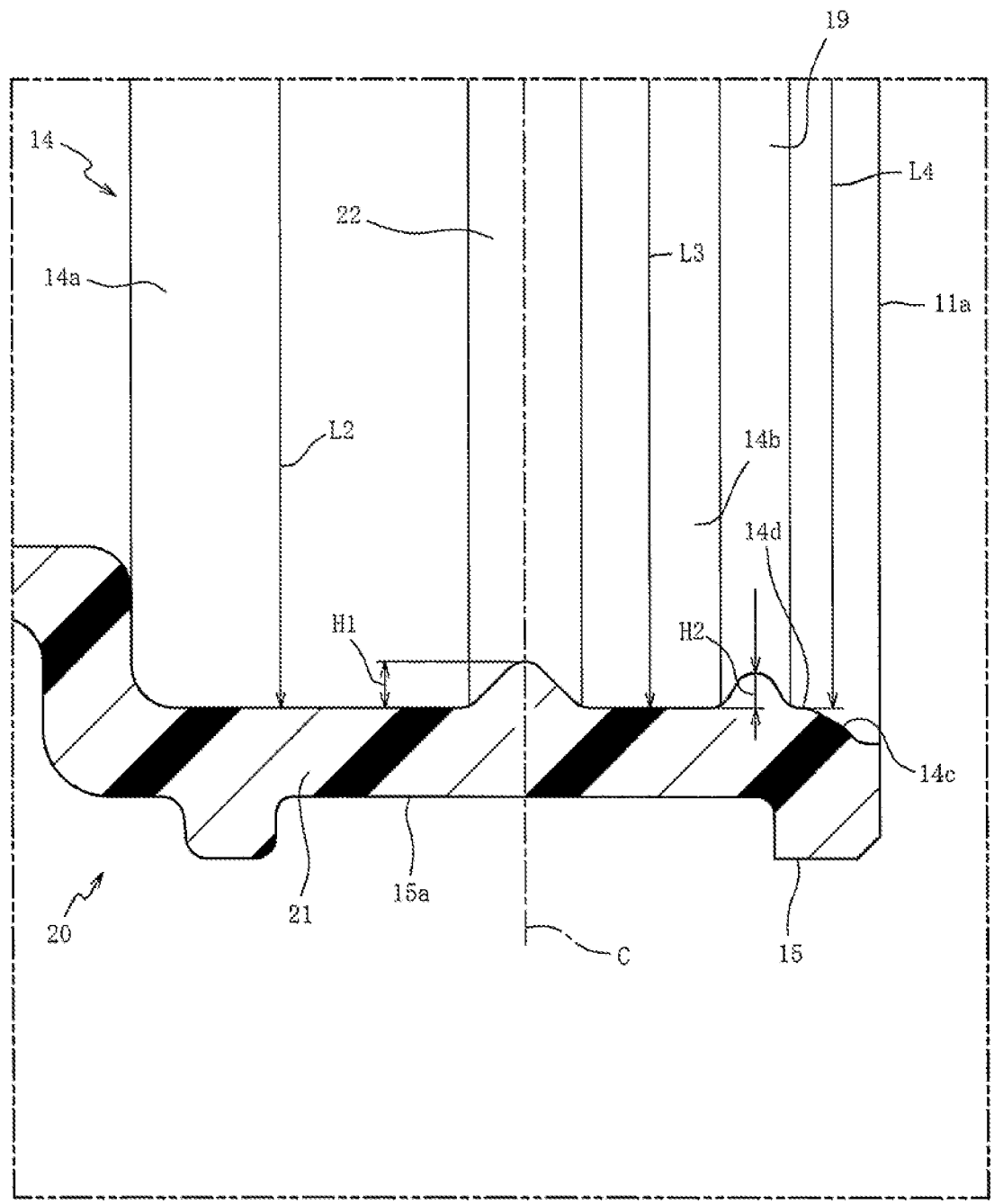
FIG. 6 is a partially enlarged cross-sectional view of a boot according to a second embodiment.

Next, referring to FIG. 6, a second embodiment will be described. In the first embodiment, the case where two seal lips 17 and 18 are provided on the inner circumferential surface 14 of the large-diameter tubular portion 11 has been described. On the contrary, in the second embodiment, the case where one seal lip 22 is provided on the inner circumferential surface 14 of a large-diameter tubular portion 21 will be described. It should be noted that the same portions as the first embodiment are indicated by the same reference numerals, and are not described below. FIG. 6 is a partially enlarged cross-sectional view of a boot 20 according to the second embodiment.

As illustrated in FIG. 6, one seal lip 22 and one protrusion 19 that protrude from the inner circumferential surface 14 are provided in the large-diameter tubular portion 21 of the boot 20 so as to be continuous over the entire circumference. The seal lip 22 is the portion that provides the local surface pressure to the outer case 4 to provide the seal between the large-diameter tubular portion 21 and the outer case 4. The seal lip 22 is disposed on the opposite side of the opening end 11a with respect to the protrusion 19.

The seal lip 22 is provided on the inner circumferential surface 14 at the position where the fastening groove 15a is projected to the inside in the radial direction. The seal lip 22 is formed so as to be symmetrical with respect to the center position C in the axial direction of the fastening groove 15a. With this, when the large-diameter tubular portion 11 is fastened by the fastening member 8, the surface pressure from the seal lip 22 to the outer case 4 can be substantially uniform, so that the surface pressure by the seal lip 22 can be higher.

In the boot 20 according to the second embodiment, like the boot 10 according to the first embodiment, while the surface pressure necessary for the seal between the outer case 4 and the large-diameter tubular portion 21 is secured by the seal lip 22, the insertion load of the outer case 4 to the large-diameter tubular portion 21 can be reduced by the protrusion 19 that is disposed on the opening end 11a side with respect to the seal lip 22.

According to the second embodiment, since only one seal lip 22 is provided on the inner circumferential surface 14, the seal lip 22 and the protrusion 19 can be greatly spaced from each other in the axial direction, as compared with the first embodiment in which two seal lips 17 and 18 are provided on the inner circumferential surface 14. With this, the inhibition of the deformation of the seal lip 22 by the protrusion 19 can be further prevented. As a result, the surface pressure by the seal lip 22 can be much higher.

The present invention has been described above based on the respective embodiments, but the present invention is not limited to the embodiments at all, and it can be easily inferred that various modifications can be made within the range not departing from the purport of the present invention. For example, the respective shapes and the respective dimensions of the large-diameter tubular portions 11 and 21, the small-diameter tubular portion 12, the bellows portion 13, and the like may be appropriately changed.

In the respective embodiments, the case where the boots 10 and 20 are mounted on the constant velocity joint 1 of the tripod type has been described, but the present invention is not necessarily limited to this. The boots 10 and 20 may be mounted on a slidable constant velocity joint other than the constant velocity joint of the tripod type that is expanded and shrunk at the coupling portion of the first transmission shaft 2 and the second transmission shaft 3, and the boots 10 and 20 may be mounted on a stationary constant velocity joint that is not expanded and shrunk at the coupling portion.

In the first embodiment, the case where two seal lips 17 and 18 are provided on the inner circumferential surface 14 of the large-diameter tubular portion 11 has been described, and in the second embodiment, the case where one seal lip 22 is provided on the inner circumferential surface 14 of the large-diameter tubular portion 21 has been described, but the present invention is not necessarily limited to these. Three or more seal lips may be provided on the inner circumferential surface 14. Also in this case, to increase the surface pressure by the plurality of seal lips, the plurality of seal lips are preferably formed so as to be symmetrical with respect to the center position C in the axial direction of the fastening groove 15a.

It should be noted that one seal lip 22 may be formed so as to be asymmetrical with respect to the center position C, and that the plurality of seal lips may be disposed so as to be asymmetrical with respect to the center position C. However, even when the plurality of seal lips are provided so as to be asymmetrical with respect to the center position C, all the respective seal lips are required to be equal to each other in the height H1 to secure the surface pressure by the respective seal lips.

In the respective embodiments, the case where the protrusion 19 is provided so as to be continuous over the entire circumference has been described, but the present invention is not necessarily limited to this. Since the protrusion 19 does not provide the seal between the outer case 4 and the large-diameter tubular portions 11 and 21, of course, the protrusion 19 including a plurality of point-like portions and linear portions can be provided so as to align over the entire circumference. It should be noted that in inserting the outer case 4 into the large-diameter tubular portion 11, the large-diameter tubular portion 11 is required to be entirely expanded (enlarged in diameter) before the outer case 4 is inserted into the seal lips 17 and 18, and that in inserting the outer case 4 into the large-diameter tubular portion 21, the large-diameter tubular portion 21 is required to be entirely expanded (enlarged in diameter) before the outer case 4 is inserted into the seal lip 22, so that the protrusion 19 is required to be provided over the entire circumference. In addition, the shorter interval in the circumferential direction between the plurality of point-like portions and linear portions configuring the protrusion 19 can easily expand the large-diameter tubular portions 11 and 21 entirely by the protrusion 19. Further, when the protrusion 19 is continuous in the circumferential direction, the large-diameter tubular portions 11 and 21 can be expanded by the protrusion 19 more easily.

In the respective embodiments, the case where part of the protrusion 19 is provided on the inner circumferential surface 14 at the position where the fastening groove 15a is projected to the inside in the radial direction has been described, but the present invention is not necessarily limited to this. The entire protrusion 19 may be provided on the inner circumferential surface 14 at the position where the fastening groove 15a is projected to the inside in the radial direction. In addition, the entire protrusion 19 may be provided on the inner circumferential surface 14 at the position other than the position where the fastening groove 15a is projected to the inside in the radial direction. In this case, since the protrusion 19 is not sandwiched between the fastening member 8 and the outer case 4, making the surface pressure provided from the seal lips 17, 18, and 22 to the outer case 4 non-uniform in the axial direction by the protrusion 19 can be prevented.

In the respective embodiments, the case where the distance L1 from the axis O1 to the outer circumferential surface of the outer case 4 is substantially constant over the axial direction, and the distance L2 from the axis O1 to the first portion 14a, the distance L3 from the axis O1 to the second portion 14b, and the distance L4 from the axis O1 to the parallel portion 14d are the same as the distance L1 from the axis O1 to the outer circumferential surface of the outer case 4 has been described, but the present invention is not necessarily limited to this. In the cross section including the axis O1, a convex portion and a concave portion that are fitted to each other on the outer circumferential surface of the outer case 4 and the inner circumferential surface 14 (the first portion 14a, the second portion 14b, and the parallel portion 14d) may be provided. In this case, in the cross section including the axis O1, the protrusion 19 may be provided on the inner circumferential surface 14 in the portion in which the distance from the axis O1 is minimum, the portion being on the opening end 11a side with respect to the seal lips 17, 18, and 22 provided on the inner circumferential surface 14 in the portion in which the distance from the axis O1 is minimum. With this, while the surface pressure by the seal lips 17, 18, and 22 is secured, the insertion load of the outer case 4 can be reduced.

In the respective embodiments, the case where in the cross section including the axis O1, the distance L4 from the axis O1 to the parallel portion 14d and the distance L1 from the axis O1 to the outer circumferential surface of the outer case 4 are the same has been described, but the present invention is not necessarily limited to this. When in the cross section including the axis O1, the distance L4 from the axis O1 to the parallel portion 14d is equal to or less than the distance L1 from the axis O1 to the outer circumferential surface of the outer case 4, the position in the radial direction of the outer case 4 that is guided to the parallel portion 14d along the diameter reduction portion 14c is determined. It should be noted that when in the cross section including the axis O1, the distance L4 from the axis O1 to the parallel portion 14d and the distance L1 from the axis O1 to the outer circumferential surface of the outer case 4 are substantially the same, the insertion load of the outer case 4 to the parallel portion 14d can be reduced while the position in the radial direction of the outer case 4 that is guided to the parallel portion 14d is determined.

The invention claimed is:

1. A boot that is mounted on a constant velocity joint in which a second transmission shaft is fitted into an outer case of a first transmission shaft, is fastened and fixed to the constant velocity joint by fastening the outer circumferential surface of the boot by a fastening member having a band shape, and includes an elastic body, the boot comprising:
   a large-diameter tubular portion into which the outer case is inserted;
   a small-diameter tubular portion mounted on the second transmission shaft; and
   a bellows portion coupling the large-diameter tubular portion and the small-diameter tubular portion to each other and being expandable and shrinkable in an axial direction of the large-diameter tubular portion,
   wherein the large-diameter tubular portion and includes:
   a fastening groove recessed in an outer circumferential surface of the large-diameter tubular portion over an entire circumference and into which the fastening member is fitted;
   an opening end into which the outer case is inserted, and in which one end in the axial direction is coupled to the bellows portion and the other end in the axial direction is opened to an outside;
   at least one seal lip having an annular shape and protruding from an inner circumferential surface of the large-diameter tubular portion at the position where the fastening groove is projected to an inside in a radial direction, so as to be continuous over the entire circumference; and
   a protrusion protruding from the inner circumferential surface on the opening end side with respect to the seal lip so as to be provided over the entire circumference,
   wherein a height of the protrusion is set to 40% to 85% of a height of the seal lip,
   where the height of the protrusion is defined as a radial dimension from the inner circumferential surface of the large-diameter tubular portion between the protrusion and the seal lip to a tip of the protrusion, and
   where the height of the seal lip is defined as a radial dimension from the inner circumferential surface of the large-diameter tubular portion between the protrusion and the seal lip to a tip of the seal lip.

2. The boot according to claim 1,
   wherein the seal lip and the protrusion are disposed so as to be spaced from each other in the axial direction,
   wherein in a cross section including an axis of the large-diameter tubular portion, a distance from the axis to the inner circumferential surface between the seal lip and the protrusion and a distance from the axis to the inner circumferential surface at the portion of the seal lip continuous to the bellows portion side are set to be the same.

3. The boot according to claim 2,
   wherein multiple seal lips are provided,
   wherein in a cross section including an axis of the large-diameter tubular portion, a distance from the axis to the inner circumferential surface between the seal lips is the same as a distance from the axis to the inner circumferential surface on both sides of the seal lips.

4. The boot according to claim 1,
   wherein the inner circumferential surface includes:
   a diameter reduction portion that is reduced in diameter from the opening end toward the protrusion in the cross section including the axis of the large-diameter tubular portion; and
   a parallel portion that couples the diameter reduction portion and the protrusion in parallel with the axis in the cross section including the axis,
   wherein in a cross section including an axis of the large-diameter tubular portion, a distance from the axis to the parallel portion is set to be equal to or less than a distance from the axis to the outer circumferential surface of the outer case.

5. The boot according to claim 1, wherein an entirety of an inner circumferential surface of the large diameter tubular portion contacts the outer case.

* * * * *